Patented Nov. 16, 1926.

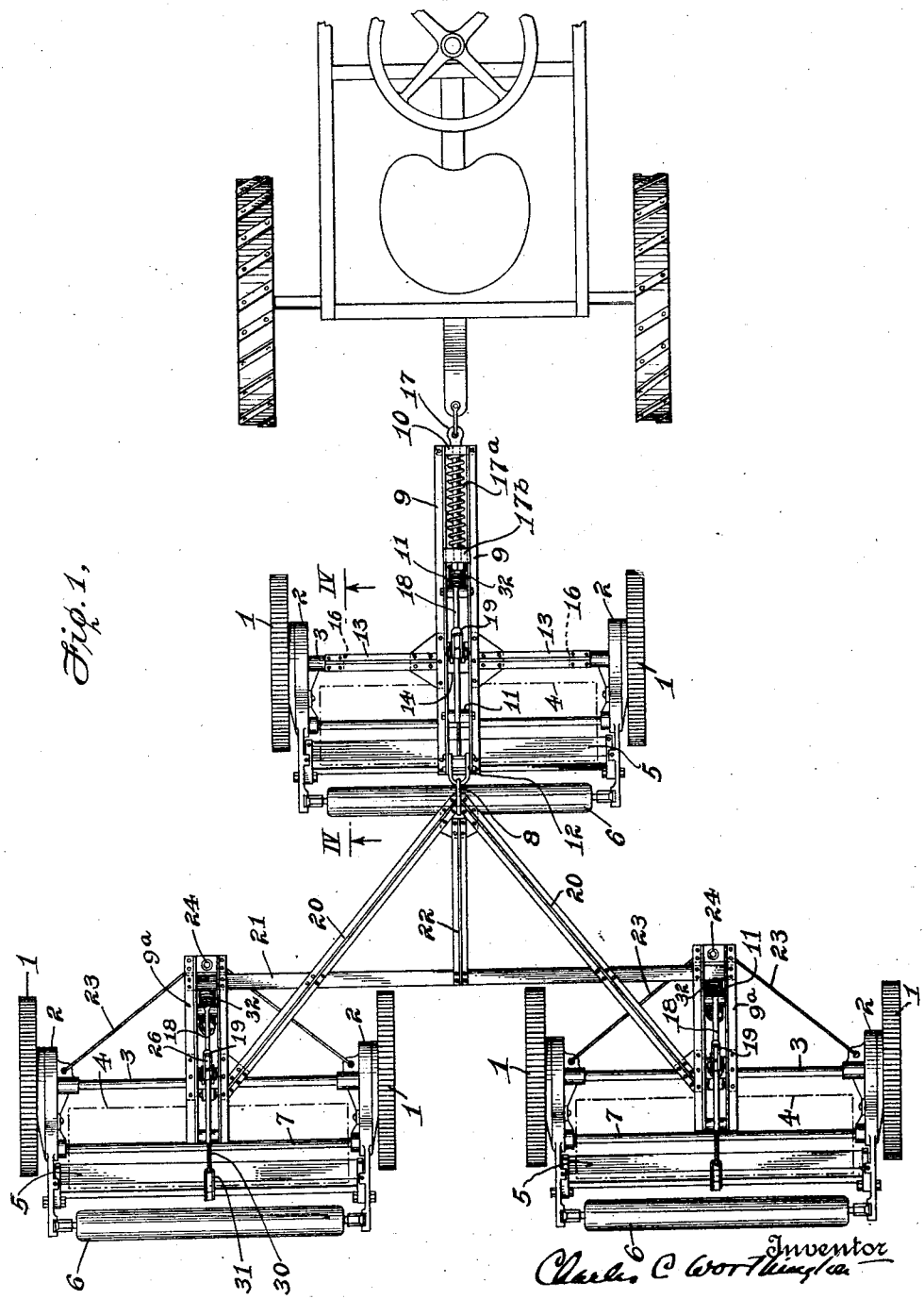

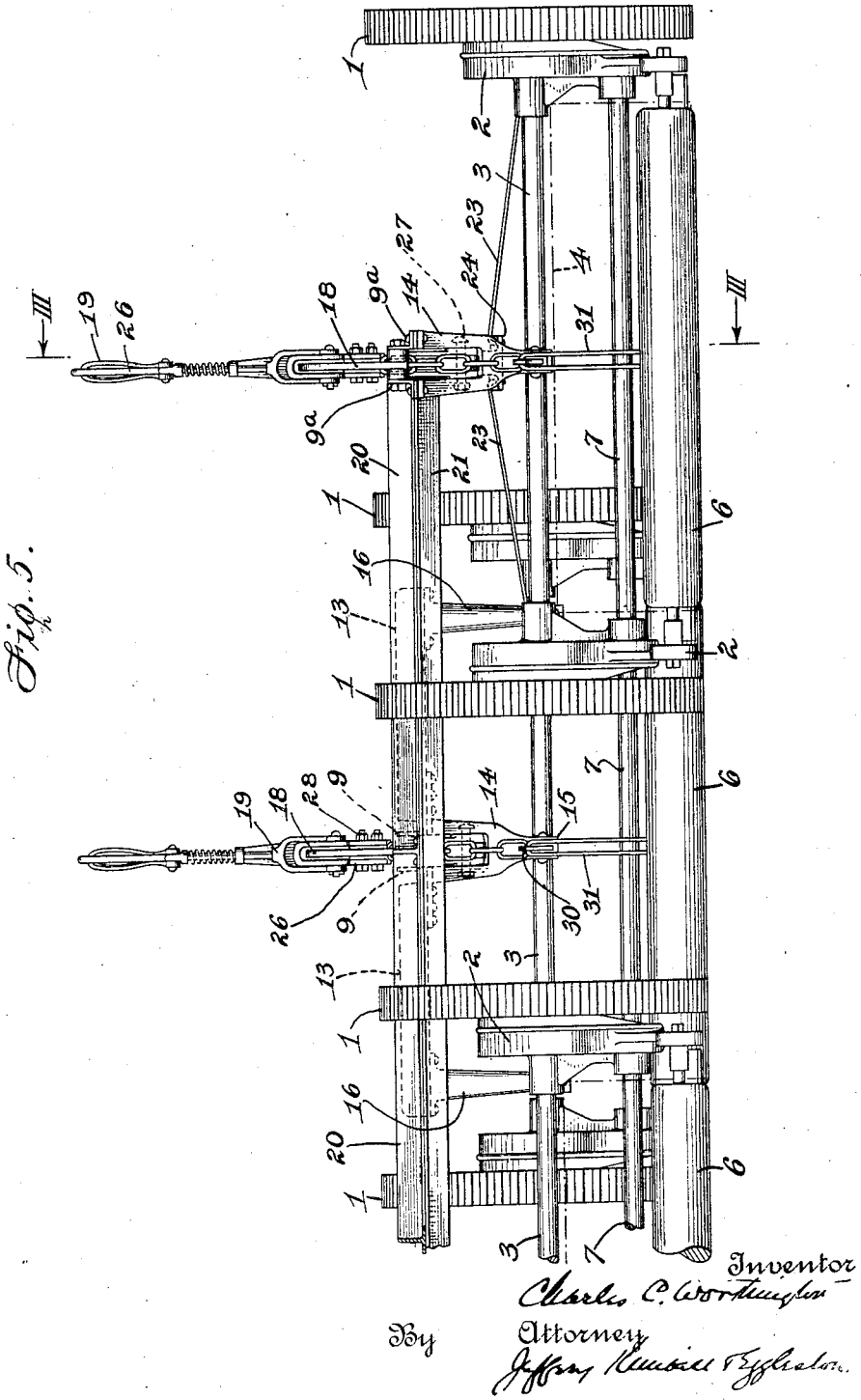

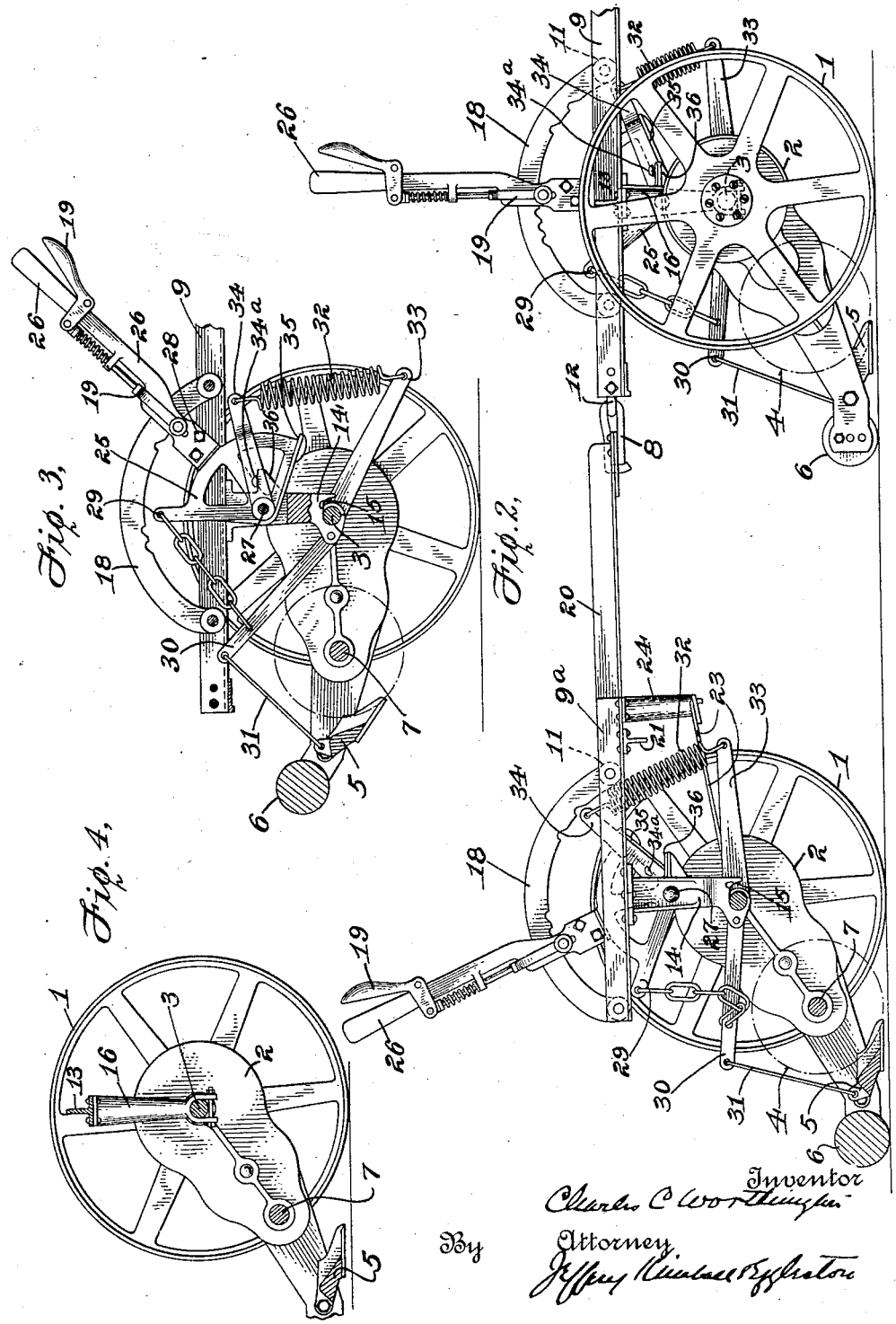

1,607,378

UNITED STATES PATENT OFFICE.

CHARLES C. WORTHINGTON, OF DUNNFIELD, NEW JERSEY.

GANG LAWN MOWER.

Application filed May 13, 1920. Serial No. 381,029.

The improvements refer to the structure of the gang frame by which the several lawn mower units are held in their spaced arrangement and permitted to accommodate the undulations of the ground and also to the means for adjusting the units to cut the grass with different heights of cut. The purposes of the invention are disclosed below in connection with the form of machine at present preferred as shown in the accompanying drawing, wherein—

Figure 1 is a plan view showing the gang mower drawn by a tractor;

Figure 2 a side elevation with the rear unit in section;

Figure 3 a section on line III—III of Figure 5 showing the cutter mechanism raised;

Figure 4 a detail of the front unit operating on line IV—IV of Figure 1, and

Figure 5 is a partial rear elevation.

The three lawn mower units constituting the gang in the present case may be understood to represent a common or any suitable form of mower unit, each having a pair of ground wheels 1, side gear casings 2, and a cross rod 3 constituting the unit frame, a rotary cutter 4 appropriately driven by the ground wheels, and for convenience represented in dot and dash lines in the drawings, a bed knife 5, and a ground roller 6. The cutter reel shaft is marked 7. One unit is disposed in front and two in rear so that their swaths overlap and the main framework or gang frame is carried on the cross rods 3 of the frames of each of the three units. These cross rods coincide as usual with the axes of the ground wheels, although that is not necessary and the gang frame can be mounted on, over, or otherwise in association with the units in various ways according to the type and mode of operation of the unit employed. The gang frame is composed of front and rear sections connected by a detachable link 8 representing a universal joint which permits one section to turn and tilt in every direction with respect to the other and as demanded by the conditions of use. The front section comprises two longitudinal parallel channel bars or angle ends 9 bolted together with intervening spacers 10, 11 and 12 so as to form an open space between them to accommodate the unit adjusting means presently described, and it also includes two lateral T-iron arms 13 extending parallel with and above the frame rod 3 of the unit. These arms are secured to the bars 9 by a central post casting 14 which is provided with flanges for the purpose and with the usual gussets as shown. This post member as shown more clearly in Figure 5 is divided at its upper end and directly below the open space between the angle bars 9, also for the purpose of accommodating the unit adjusting means, and at its lower end it is provided with an open slot 15 which embraces and may rest upon the middle of the frame rod 3. The two posts 16 bolted to the extreme ends of the T-iron arms 13 form tne support of the front section on the unit, the lower ends of these posts being crotched for attachment to the frame rod 3 as indicated in Figure 4 and located near the side casings of the unit. Such an attachment permits the cutter mechanism at the rear end of the unit to be raised and lowered about the axis of the rod 3 as a center. When the mower is to be drawn by a tractor the forward end of the space between the angle bars 9 houses the draw bar 17 and also the spring 17ª through which the draft on the latter is imparted to the whole machine. It will be noted that by reason of the short length of the supporting post 16 the front section of the gang frame occupies a plane wholly below and between the tops of the ground wheels so that the draft line is thus close to the level of the wheel axis. When the machine is horse drawn the shaft couplings are preferably attached directly to the ends of the T-iron arms 13 above the posts 16. The two spacers 11 and their respective bolts form the support for a notched arc plate 18 located centrally of and above the space between the angle bars 9 and serving as the fixed member to be engaged by the latch mechanism 19 of the unit adjusting means by which the cutter mechanism is raised and lowered.

The rear frame section is composed of two oblique T-iron bars 20 extending divergently rearward from the hook joint 8 to points near the centers of the two rear units, a cross bar 21 intersecting the oblique bars near their middle point and riveted to them and a tie bar 22 connecting the middle of the cross bar to the junction or apex of the oblique bars. The adjacent ends of the oblique bars and the cross bar are united by two parallel spaced angle bars 9ª similar to the bars 9 above described and adapted in like manner to accommodate between them the adjusting means for their respective mower units. A divided center post 14, quite the same as that already described and bolted to the underside of each pair of bars 9ª, forms the supporting connection between the rear frame section and the two rear units, the lower ends of these posts being provided with open slots or seats as before which rest upon the cross rods 3 at about their middles so that each unit is thus free to tilt vertically in the plane of its own wheel axis with reference to the gang frame. The rear units are further connected to the frame by the guy links 23, each constructed or otherwise connected to their side casings 2 and to a guy post 24 rigidly depending from the forward ends of the united bars 9ª. These links maintain the lateral position of the units parallel with the cross bar 21 without interfering with their tilting or cutter lifting movement above mentioned. The divided posts 14 for the rear units maintain the rear frame section at the same level as the front section, i. e. below the tops of the ground wheels. It will be apparent that the rear units can not only tilt independently of each other but that the whole rear frame section can tilt independently of the front section and can also turn laterally with reference thereto as required when rounding corners. The pairs of spaced frame bars 9ª each carry an arc plate 18 like that over the front unit and the unit adjusting means and hand lever mechanism is accommodated between the said pairs, this mechanism being the same for each unit of the gang. The hand lever of the unit adjusting mechanism is constituted of a sector-shaped part 25 and a handle part 26, which latter carries the latch 19 above mentioned. The sector part is fulcrumed on a pin 27 so that it may swing in the open space between the divided parts of the post 14, below the arc plate and within the space between the angle bars 9 or 9ª, and the handle part 26 is forked to straddle said plate and embrace the sector, to which it is bolted by the bolts 28. The rear end or arm 29 of the sector is adapted to raise the cutter mechanism of the unit, being for this purpose connected by a chain to the strut link 30, which latter is pivoted to the foot of post 14 and connected at its free end by link 31 to the center of the bed knife 5, itself connected to the side frame members 2 which may be considered as constituting lever arms or a lever arm turning about the axis of a rod 3. When the handle 21 is thrust forward as indicated in Figure 3, the arm 29 and its chain and link connections just described raise the roller 6 and the cutter mechanism from the ground and hold it at an elevation determined by the notch in the arc plate to which the lever may be latched. When in this position as well as when lowered, the cutter mechanism is or may be pressed toward the ground by a spring 32 connected at one end to the end of an arm 33 fast to the mower unit, and at the other to a spring holder 34, which latter is pivoted on the same pivot (27) as the hand lever immediately adjacent to the sector part 25, but movable independently thereof. The said spring holder is adapted to be supported against the pull of the spring by the flange 35 on the sector, which flange is placed to engage it, or it may be supported by the fixed bracket part 36 projecting forwardly from the post 14 close to one side of the spring holder and adapted to support the latter by engaging its lug 34ª laterally projecting therefrom (see Fig. 2). When the hand lever is thrust to the rear or so as to lower the cutter mechanism, the sector flange 35 encounters the lower side of the spring holder 34 and lifts it as shown in the rear unit of Figure 2 and thereby puts more or less tension on the spring and correspondingly pressing the cutter mechanism toward the ground. In this movement the spring holder is operated as though it were a lever arm fixed to the hand lever 26 and, considered as such, it is shorter in length than the arm 33, which condition contributes to the effects produced. Forward movement of the lever diminishes the spring tension up to the middle or neutral point, indicated in the front unit of Figure 2, where the tension has diminished to zero or to a minimum, and as the said movement is continued beyond the neutral point, as in Figure 3, it raises the cutter mechanism but without further moving or lowering the spring holder 34, which now rests by its lug 34ª upon the bracket 36. As the cutter mechanism rises the downward swing of the arm 33 puts the spring again under tension so that the cutter mechanism is urged toward the ground, although now in its raised position. In this position the unit is adjusted for making a high cut of the grass, being aided thereto by spring pressure which holds its cutter mechanism to its work. Thus the single operating means serves for adjustably varying the spring tension when the roller 6 is on the ground and for raising the roller to adjust the height of cut and also causes a suitable downward pressure to be exerted when the cutter is raised.

It will be noted that the gang frame is Y-shaped the point of pivotal and preferably of universal connection between the stem section and the arm section being located in the plane of the stem section, which plane in the illustrated construction is also the central longitudinal plane of a front unit.

It will be obvious that the front unit is normally supported in horizontal position by the draft mechanism, whether that be a draw-bar or horse shafts, and in the latter case that a driver's seat may, if desired, be mounted on the gang frame, preferably on the rear section thereof, in which position he will be able to reach all the hand levers, and further that various of the features herein disclosed may be used independently of the others and within this invention, it being obvious for example, that the arrangement of the frame members is quite as useful with bearing posts of greater length than shown and that the features of the adjusting mechanism as described, can be incorporated in various styles of single and gang frames, and further, that various changes in the proportions and relative arrangement of the parts described as well as additions thereto and subtractions therefrom may be resorted to without sacrificing the results of this invention or departing from the principle thereof as now fully disclosed.

The spring-yielding draw bar 17 described above as housed between the forward ends of the frame members 9, slides in a hole in the front spacer 10, and its rear end is attached to a cross-head 17$^b$ which slides on and is confined to the members 9, the spring 17$^a$ being interposed between the spaces and cross-head and thus concealed and protected by the framework. The intervention of such a spring or equivalent yielding connection in the line of the draft-pull between the tractor and the mower removes a serious objection to the use of motor vehicles for drawing gang mowers over a lawn, and constitutes an important and independent feature, which, however, is disclosed and claimed in a companion application, Serial No. 471,130, filed May 20, 1921.

Claims:

1. In a gang lawn mower, a gang of lawn mower units each having ground wheels, a gang frame formed of front and rear sections both located below the level of the wheel tops and having below the said level a universal joint between them and connecting said units in the spaces between their ground wheels, the draft strain being transmitted through frame members located around and between and below the tops of the driving ground wheels of the units.

2. In a gang lawn mower, a gang of lawn mower units having ground wheels, a gang frame formed of front and rear pivotally connected frame sections, the front section being supported on a front unit and the rear section comprising rearwardly divergent frame members extending from the pivotal connection to positions adjacent the centers of the two rear units, and a pivotal connection between said rear section and each rear unit permitting each unit to tilt in the plane of its own wheel axis.

3. In a gang lawn mower, a gang of lawn mower units each having ground wheels and a gang frame serving to unite and space a plurality of said units and including two angularly divergent frame members each connected to a different unit.

4. In a gang lawn mower, a gang of lawn mower units each having ground wheels and a gang frame including two divergently located frame members and a cross member whose remote ends are connected to different mower units between their ground wheels intersecting the said members and secured thereto.

5. In a gang lawn mower, a gang of mower units and a gang frame including two horizontal divergent frame members, a cross member intersecting the same and secured thereto, and post members connected with the adjacent ends of said divergent and cross members and constituting means for supporting said members upon the lawn mower units.

6. In a gang lawn mower, a gang of lawn mower units, a gang frame comprising frame members and a divided post member forming the connection between said members and a mower unit, and unit adjusting mechanism occupying the space between the divided parts of said post member.

7. In a gang lawn mower, a gang of lawn mower units, a gang frame supported thereon and comprising post members constituting the means whereby said frame is supported on the units, closely spaced frame members providing narrow open spaces directly over said post members, and unit adjusting mechanism accommodated in said spaces and located over the post members.

8. In a gang lawn mower, a lawn mower unit having its cutter mechanism provided with lever arms, an operating member having a lever arm connected to one of the arms of the cutter mechanism, a pivoted holder arm operatively connected to said operating member, and a spring for pressing said cutter mechanism to the ground connecting said holder arm and the other arm of the cutter mechanism, the arm lengths being so related as to give the cutter-mechanism-connected end of the spring greater movement than the holder-arm-connected end when the cutter mechanism is raised.

9. In a gang lawn mower, a lawn mower unit, a spring pressing its cutter mechanism toward the ground, a movable spring holder and means movable independently of said holder for raising the cutter mechanism from the ground.

10. In a gang lawn mower, a lawn mower unit having a spring for pressing its cutter mechanism toward the ground, a spring holder and an operating member engageable with and disengageable from said spring holder and movable in one direction for lowering said cutter mechanism and having means adapting it by said movement to move into engagement with and operate said holder to increase the tension of the spring.

11. In a gang lawn mower, a lawn mower unit having a spring for pressing its cutter mechanism toward the ground, a unit adjusting mechanism comprising a hand-operated lever arm, a cutter raising arm, and an independently movable spring holder.

12. In a gang lawn mower, a lawn mower unit having an operating member for raising and lowering its cutter mechanism and comprising a cutter raising arm, a pivoted strut link connected to and operated by said arm and a cutter lifting connection between said link and the cutter mechanism.

13. In a gang lawn mower, a lawn mower unit, an operating member for raising and lowering its cutter mechanism, a spring acting to press said mechanism toward the ground both in its raised and lowered position, and a movable spring holder, said operating member being movable independently of said holder.

14. In a gang lawn mower, a gang of lawn mower units having ground wheels, a gang frame formed of a front section connected to a front unit, and a rear section pivoted to said front section and having rearwardly divergent members each connected to a rear mower unit between its ground wheels.

15. In a gang lawn mower, a gang of lawn mower units each having ground wheels, and a gang frame formed of front and rear sections pivotally connected, one of said frame sections being placed over one or more of said mower units, and the other of said frame sections being supported on a plurality of said other mower units between their respective ground wheels, members constituting part of the latter frame section extending obliquely from adjacent the pivotal connection of the frame sections to adjacent the respective points of support.

16. A gang lawn mower comprising a lone front lawn mower unit and rear lawn mower units each having ground wheels and a gang frame symmetrical with respect to the central longitudinal vertical plane of the mower and having a front section mounted on the front unit between its ground wheels, and a rear section having at its front end a universal connection to the front section in the said plane and having members diverging from said plane rearwardly to the spaces between the ground wheels of the respective rear units on which they are mounted, the several mower units having capability of tilting in the planes of their respective axes.

17. In a gang lawn mower, a gang of mower units each having driving ground wheels, and a Y-shaped gang frame serving to unite and space a plurality of said units and having a stem section located in the central vertical plane of the mower and an arm section joined thereto adjacent the apex of the Y arms by a universal joint in the said plane, the arm section being a braced skeleton structure.

18. In a gang lawn mower, a gang of mower units, a skeleton gang frame section mounted on units of the gang and having members relatively divergent from a meeting point and having at their remote ends posts each mounted on a different unit, and unit adjusting mechanism mounted on said frame adjacent said ends.

19. In a gang lawn mower, a gang of mower units, and a skeleton gang frame section spacing units of the gang and having a central member and side members all relatively divergent from a meeting point and a brace member intersecting the relatively divergent members.

20. In a gang lawn mower, a gang of lawn mower units each having ground wheels, a substantially horizontal gang frame having front and rear sections, the front section mounted on the front unit and extending in the central vertical plane of said unit and in the line of draft and the rear section having a universal connection in the said plane with the rear of the front section and having side members and an intermediate member relatively diverging from the point of universal connection, the intermediate member being in prolongation of the front section and means in rear of their meeting point for connecting and bracing said members.

21. In a gang lawn mower, a gang of lawn mower units each having ground wheels, a gang frame having pivotally connected front and rear sections spacing said units each frame section having a pair of spaced members corresponding to each unit over which it is mounted and located in vertical planes at right angles to the respective unit axes, and unit adjusting mechanism for each unit comprising a hand lever whose operating arm plays in the space between the pair of spaced members corresponding to that unit.

22. In a gang lawn mower, a gang of lawn mower units having ground wheels, a gang frame formed of front and rear pivotally connected frame sections, the front section being connected to a front unit and the rear section comprising rearwardly divergent frame members extending from the pivotal connection to positions adjacent the centers of two rear units, and a pivotal connection between said rear section and each rear unit permitting each unit to tilt in the plane of its own wheel axis.

23. In a gang lawn mower, a gang of lawn mower units each having ground wheels and a gang frame serving to unite and space a plurality of said units and comprising two pivotally connected sections one of which includes two angularly divergent frame members each connected to a different unit.

24. In a gang lawn mower, a gang of mower units, and a Y-shaped gang frame serving to unite and space a plurality of said units and having a stem section and an arm section joined to the stem section adjacent the apex of the Y arms by a universal joint in the plane of the stem section.

25. In a gang lawn mower, a gang of mower units, and a Y-shaped gang frame serving to unite and space a plurality of said units and having a stem section and an arm section pivoted to the stem section adjacent the apex of the Y arms.

26. In a gang lawn mower, a gang of mower units, and a Y shaped gang frame serving to unite and space a plurality of said units and having a stem section mounted over the front mower unit and an arm section pivoted to the stem section adjacent the apex of the Y arms, and a pivotal connection between the other end of each Y arm and a rear mower unit permitting each such unit to tilt in the plane of its own wheel axis.

27. In a gang lawn mower, a gang of lawn mower units each having ground wheels, a gang frame supported by the mower units and formed of flexibly connected front and rear sections, both located below the level of the wheel tops and connecting said units in the spaces between their ground wheels, the draft strain being transmitted through frame members located around and between and below the tops of the driving ground wheels of the units, said spacing and uniting structure flexibly keeping the wheel axes of the respective units always square to the direction of travel but permitting the units to tilt in the planes of their respective ground wheel axes.

28. In a gang lawn mower having a gang of lawn mower units each having ground wheels, the combination of a gang frame supported by said ground wheels and whose principal draft members are situated below the level of the wheel tops and between the same, said frame having rigid post members depending from the frame in front of certain of said units, flexible draft connections between said members and said respective units adapted to keep the units with their wheel axes always at right angles to the longitudinal frame axis but each free to tilt in the plane of its own wheel axis.

29. In a gang lawn mower, a gang of lawn mower units having ground wheels, a gang frame formed of flexibly connected front and rear sections whose principal members are situated below the level of the wheel tops and connect the units in the spaces between their ground wheels, one of said frame sections having closely spaced fore and aft frame members located in the central longitudinal planes of the respective units connected thereto, and cutter adjusting means for said units comprising hand levers pivoted below the spaced frame members of the corresponding unit.

30. In a gang lawn mower, a gang of lawn mower units each having ground wheels, a gang frame, the principal draft members of which are located below the level of the wheel tops, connecting said units in the spaces between their ground wheels, the draft strain being transmitted through frame members located around and between and below the tops of the driving ground wheels of the units, an operating member for each lawn mower unit for raising and lowering its cutter mechanism, and a bodily movable spring associated with said cutter mechanism, acting to press said mechanism toward the ground and being under tension when the cutter is elevated.

31. In a gang lawn mower, a gang of lawn mower units each having ground wheels, and a gang frame supported by said ground wheels and whose principal draft members are located below the level of the wheel tops, connecting said units in the spaces between their ground wheels, the draft strain being transmitted through frame members located around and between and below the tops of the driving ground wheels of the units, each unit comprising adjustable cutter mechanism and an adjustable handle operatively associated with and mounted over the cutter mechanism of each individual unit.

32. In a gang lawn mower, a gang of lawn mower units each having ground wheels and arranged with one unit in front and two in rear connected by a gang frame the principal draft members of which are located below the level of the wheel tops and which is formed of front and rear sections having a universal joint between them and connecting said units in spaces between their ground wheels.

33. In a gang lawn mower, a gang of lawn mower units each having ground wheels, cutter mechanism, means for raising and lowering said cutter mechanism and a spring associated with said cutter mechanism to press it toward the ground, the gang being arranged with one unit in front and two in rear connected by a gang frame the principal draft members of which are located below the level of the wheel tops and which is formed of front and rear sections having a universal joint between them and connecting said units in spaces between their ground wheels.

34. In a gang lawn mower, a lawn mower unit, means for raising and lowering its cutter mechanism, a spring connected to the cutter mechanism, a movable spring holder, a stop therefor, and means associated with the cutter raising and lowering means for engaging and operating the spring holder.

35. In a gang lawn mower, a lawn mower unit, an operating member for raising and lowering its cutter mechanism, a spring connected to the cutter mechanism, a pivoted spring holder arm, a stop in the path of said arm, and a flange carried by the operating member into and out of contact with the spring holder arm to move it from or toward stop engaging position.

36. In a gang lawn mower, a lawn mower unit, an operating member for raising and lowering its cutter mechanism, a spring connected to the cutter mechanism, a pivoted spring holder arm coaxial with said operating member, a stop in the path of said spring holder arm and a flange carried by the operating member into and out of contact with said spring holder arm to move it from or toward stop engaging position.

37. In a gang lawn mower, a gang of lawn mower units, a gang frame comprising frame members and a divided post member forming the connection between said members and a mower unit and located in a plane at right angles to the wheel axis of the unit and midway between its wheels, and unit adjusting mechanism located directly over said divided post member and occupying the space between the divided parts thereof.

38. In a gang lawn mower, a gang of lawn mower units, a gang frame comprising frame members and a divided post member forming the connection between said frame members and a mower unit, and a unit adjusting hand lever pivotally mounted for fore and aft movement in the space between the divided parts of said post member.

39. In a gang lawn mower, a gang of lawn mower units, a gang frame comprising frame members and a divided post member forming the connection between said members and a mower unit, a pair of spaced frame members each mounted on one of the divided parts of the post member and having an inner face substantially in vertical alignment with the inner face of the corresponding post part, and a unit adjusting hand lever pivoted on said post member between its divided parts for fore and aft movement between them.

40. In a gang lawn mower, a gang of lawn mower units having ground wheels, a gang frame formed of flexibly connected front and rear sections spacing said units, one of said frame sections having closely spaced fore and aft frame members located in the central longitudinal planes of the respective units connected thereto, and cutter adjusting means comprising hand levers located respectively between and pivoted below the members of each pair of said frame members.

41. In a gang lawn mower, a gang of lawn mower units having ground wheels, a gang frame formed of front and rear flexibly connected sections, means for supporting said sections over the respective mower units including divided post members, said sections having closely spaced fore and aft frame members secured to the divided post members and located therewith in the central longitudinal planes of the respective units, and cutter adjusting means located between said frame members.

42. In a gang lawn mower, a gang of lawn mower units each having ground wheels, and a gang frame including two divergently located frame members whose remote ends are connected to different mower units between their ground wheels, a cross member intersecting the said members and secured thereto, and longitudinal framing connecting adjacent ends of said divergent frame members and cross member.

43. In a gang lawn mower, a gang of lawn mower units each having ground wheels and a gang frame including two divergently located frame members whose remote ends are connected to different mower units between their ground wheels, a cross member intersecting the said members and secured thereto, longitudinal framing connecting adjacent ends of said divergent frame members and cross member, and a central longitudinal tie bar connecting adjacent ends of said divergent frame members with the cross member.

44. In a gang lawn mower, a gang of lawn mower units each having ground wheels and a gang frame including two divergently located frame members whose remote ends are connected to different mower units between their ground wheels, a cross member intersecting the said members and secured thereto, pairs of closely spaced fore and aft frame members connecting adjacent ends of said divergent frame members and cross member, and cutter adjusting means mounted between said spaced frame members.

In testimony whereof, I have signed this specification.

CHARLES C. WORTHINGTON.

Certificate of Correction.

It is hereby certified that in Letters Patent No. 1,607,378, granted November 16, 1926, upon the application of Charles C. Worthington, of Dunnfield, New Jersey, for an improvement in "Gang Lawn Mowers," an error appears in the printed specification requiring correction as follows: Page 3, lines 79 and 80, claim 4, strike out the words " whose remote ends are connected to different mower units between their ground wheels" and insert the same to follow after the word " members ", line 79, same claim; and that the said Letters Patent should be read with this correction therein that the same may conform to the record of the case in the Patent Office.

Signed and sealed this 21st day of December, A. D. 1926.

[SEAL.]
M. J. MOORE,
*Acting Commissioner of Patents.*